United States Patent
Wang et al.

(10) Patent No.: US 12,046,995 B2
(45) Date of Patent: Jul. 23, 2024

(54) SWITCHING REGULATOR WITH THD AND PF COMPENSATION, THE CONTROL CIRCUIT AND THE METHOD THEREOF

(71) Applicant: Chengdu Monolithic Power Systems Co., Ltd., Chengdu (CN)

(72) Inventors: Hao Wang, Hangzhou (CN); Zhiheng Hu, Shanghai (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 284 days.

(21) Appl. No.: 17/717,502

(22) Filed: Apr. 11, 2022

(65) Prior Publication Data

US 2022/0337152 A1 Oct. 20, 2022

(30) Foreign Application Priority Data

Apr. 20, 2021 (CN) .......................... 202110427387.9

(51) Int. Cl.
*H02M 1/42* (2007.01)
*H02M 1/12* (2006.01)
*H02M 7/06* (2006.01)

(52) U.S. Cl.
CPC ........... *H02M 1/4208* (2013.01); *H02M 1/12* (2013.01); *H02M 7/06* (2013.01)

(58) Field of Classification Search
CPC ........ H02M 1/42; H02M 1/4208; H02M 1/12; H02M 7/06
See application file for complete search history.

(56) References Cited

U.S. PATENT DOCUMENTS

| | | | |
|---|---|---|---|
| 7,006,366 B2 * | 2/2006 | Panda | H02M 1/4216 363/70 |
| 8,766,605 B2 | 7/2014 | Ren et al. | |
| 9,083,245 B2 | 7/2015 | Zhao et al. | |
| 9,241,381 B2 | 1/2016 | Feng et al. | |
| 9,479,046 B2 | 10/2016 | Lin et al. | |
| 9,621,028 B2 | 4/2017 | Lin et al. | |
| 9,812,950 B2 | 11/2017 | Lu et al. | |
| 10,079,537 B2 | 9/2018 | Kuang | |
| 10,855,171 B2 | 12/2020 | Lu | |
| 2023/0107131 A1 * | 4/2023 | Wang | H02M 7/217 363/89 |
| 2023/0387793 A1 * | 11/2023 | Ito | H02M 3/158 |

OTHER PUBLICATIONS

U.S. Appl. No. 14/140,344, filed Dec. 24, 2013, Chengdu Monolithic Power Systems.
U.S. Appl. No. 13/474,545, filed May 17, 2012, Chengdu Monolithic Power Systems.
U.S. Appl. No. 16/928,257, filed Jul. 14, 2020, Chengdu Monolithic Power Systems.
U.S. Appl. No. 17/696,520, filed Mar. 16, 2022, Chengdu Monolithic Power Systems.

* cited by examiner

*Primary Examiner* — Adolf D Berhane
(74) *Attorney, Agent, or Firm* — Perkins Coie LLP

(57) ABSTRACT

A switching regulator converts an AC input voltage into an output voltage, to power a load. The switching regulator includes a power stage having a main power switch. The main power switch has different ON time durations under different AC input voltage conditions and different load currents.

20 Claims, 2 Drawing Sheets

SWITCHING REGULATOR WITH THD AND PF COMPENSATION, THE CONTROL CIRCUIT AND THE METHOD THEREOF

CROSS-REFERENCE TO RELATED APPLICATIONS

This application claims priority to and the benefit of Chinese Patent Application No. 202110427387.9, filed Apr. 20, 2021, which is incorporated herein by reference in its entirety.

FIELD

The present invention relates to electronic circuits, more specifically, the present invention relates to switching regulators and the method thereof.

BACKGROUND

In the applications such as lighting and TV, the power supply is directly obtained from the power grid. Power factor correction (PFC) technology is widely used in order to prevent pollution to the power grid. However, total harmonic distortion (THD) would be worse because of the influence of the inverse inductor current around the valley of the alternating current (AC) input voltage. In addition, as the AC input voltage increases from its valley, the sinusoidal degree of the input current worsens due to the influence of the safety capacitor and the input capacitor, which affects the power factor (PF).

Thus, compensation for the THD and PF is needed.

SUMMARY

It is an object of the present invention to provide an improved switching regulator, which solves the above problems.

In accomplishing the above and other objects, there has been provided, in accordance with an embodiment of the present invention, a switching regulator, comprising: a power stage, configured to convert an AC input voltage to an output voltage to power a load, the power stage at least having a main power switch; and a control circuit, configured to generate a control signal in response to the AC input voltage and the output voltage, to control the ON and OFF of the main power switch, so that the main power switch has different ON time durations under different AC input voltage conditions and different load currents; the ON time duration of the main power switch consisting of a basic time duration, a product of a THD compensate time duration and a first coefficient, and a product of a PF compensate time duration and a second coefficient.

In addition, there has been provided, in accordance with an embodiment of the present invention, a control circuit used in a switching regulator, the switching regulator including a power stage configured to converting an AC input voltage to an output voltage to power a load, the control circuit comprising: a proportional integral circuit, configured to generate a proportional integral signal in response to the output voltage and a voltage reference; a basic ON time duration unit, configured to generate a basic signal in response to a peak value of the AC input voltage and the proportional integral signal; a THD compensate circuit, configured to generate a THD compensate signal and a first coefficient in response to the AC input voltage and the proportional integral signal, to output a product of the THD compensate signal and the first coefficient; a PF compensate circuit, configured to generate a PF compensate signal and a second coefficient in response to the AC input voltage and the proportional integral signal, to output a product of the PF compensate signal and the second coefficient; and a logical unit, configured to generate a control signal in response to the basic signal, the product of the THD compensate signal and the first coefficient, and the product of the PF compensate signal and the second coefficient, to control a main power switch in the power stage.

Furthermore, there has been provided, in accordance with an embodiment of the present invention, a method used in a switching regulator, the switching regulator including a power stage having a main power switch, periodically controlled to be turned on and off, the method comprising: converting an AC input voltage to an output voltage, to provide power a load; adjusting an ON time duration of the main power switch in response to the AC input voltage and a load current, the ON time duration of the main power switch consisting of a basic time duration, a product of a THD compensate time duration and a first coefficient, and a product of a PF compensate time duration and a second coefficient; and setting the first coefficient and the second coefficient to be different values when the AC input voltage and the load current are in different conditions.

The use of the similar reference label in different drawings indicates the same of like components.

DETAILED DESCRIPTION

Embodiments of circuits for switching regulator are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
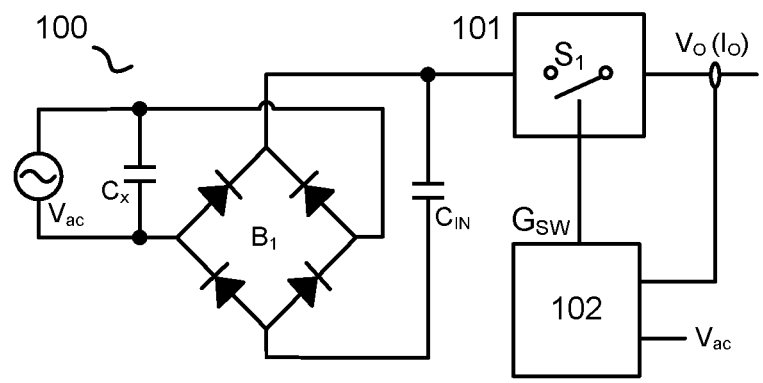
FIG. 1 schematically shows a switching regulator 100 in accordance with an embodiment of the present invention.

FIG. 1 schematically shows a switching regulator 100 in accordance with an embodiment of the present invention. In the example of FIG. 1, the switching regulator 100 comprises: a power stage 101, configured to receive an alternating current (AC) input voltage $V_{ac}$ via a rectifier $B_1$, a safety capacitor (i.e., a X capacitor) $C_X$, and an input capacitor $C_{IN}$, to provide an output voltage $V_O$ to power a load, the power stage 101 at least having a main power switch $S_1$. The power stage 101 comprises at least a main power switch $S_1$. The switching regulator 100 further comprises: a control circuit 102, configured to generate a control signal $G_{SW}$ in response to the AC input voltage $V_{ac}$ and the output voltage $V_O$, to control the ON and OFF of the main power switch $S_1$, so that the main power switch $S_1$ has different ON time durations at each switching cycle under different AC input voltage conditions and different load currents $I_O$.

In one embodiment of the present invention, the ON time duration of the main power switch $S_1$ consists of a basic time duration, a THD compensate time duration and a PF compensate time duration. Specifically, the ON time duration of the main power switch S1 consists of a sum of the basic time duration $T_B$, a product of the THD compensate time duration $T_{THD}$ and a first coefficient $k_1$, and a product of the PF compensate time duration $T_{PF}$ and a second coefficient $k_2$. The basic time duration $T_B$ is determined by a peak value of the AC input voltage $V_{ac}$ and the load current $I_O$. For example, the basic time duration $T_B$ has a functional relationship with the peak value of the AC input voltage $V_{ac}$ and the load current $I_O$. The THD compensate time duration and the PF compensate time duration both vary with an instantaneous value of the AC input voltage $V_{ac}$. For example, the THD compensate time duration and the PF compensate time duration both have a functional relationship with the instantaneous value of the AC input voltage. The first coefficient $k_1$ and the second coefficient $k_1$ both varies with a root-mean-square (RMS) value of the AC input voltage $V_{ac}$ and the load current $I_O$. When the RMS value of the AC input voltage $V_{ac}$ is higher than a high voltage threshold and the load current $I_O$ is higher than a high current threshold, the first coefficient $k_1$ has a first compensate value $k_{11}$, and the second coefficient $k_2$ has a first trim value $k_{21}$. When the RMS value of the AC input voltage $V_{ac}$ is higher than the high voltage threshold and the load current $I_O$ is lower than a low current threshold, the first coefficient $k_1$ has a second compensate value $k_{12}$, and the second coefficient $k_2$ has a second trim value $k_{22}$. When the RMS value of the AC input voltage $V_{ac}$ is lower than a low voltage threshold and the load current $I_O$ is higher than the high current threshold, the first coefficient $k_1$ has a third compensate value $k_{13}$, and the second coefficient $k_2$ has a third trim value $k_{23}$. When the RMS value of the AC input voltage $V_{ac}$ is lower than the low voltage threshold and the load current $I_O$ is lower than the low current threshold, the first coefficient $k_1$ has a fourth compensate value $k_{14}$, and the second coefficient $k_2$ has a fourth trim value $k_{24}$.

The relationship of the first coefficient $k_1$ vs. the AC input voltage $V_{ac}$ & the load condition is shown in below table 1.

TABLE 1

| $k_1$ | relatively high $V_{ac}$ | relatively low $V_{ac}$ |
|---|---|---|
| heavy load | $k_{11}$ | $k_{13}$ |
| light load | $k_{12}$ | $k_{14}$ |

The relationship of the second coefficient $k_2$ vs. the AC input voltage $V_{ac}$ & the load condition is shown in below table 2.

TABLE 2

| $K_2$ | relatively high $V_{ac}$ | relatively low $V_{ac}$ |
|---|---|---|
| heavy load | $K_{21}$ | $K_{23}$ |
| light load | $K_{22}$ | $K_{24}$ |

In one embodiment of the present invention, a real-time value $T_{B(t)}$ of the basic time duration $T_B$ has a functional relationship with the peak value of the AC input voltage $V_{ac}$ and the load current $I_O$ as below:

$$T_B(t) = \frac{k \times I_O(t)}{V_{ac\_pk}^2}$$

Wherein k is a set coefficient, $I_{O(t)}$ represents a real-time value of the load current, and $V_{ac\_pk}$ represents the peak value of the AC input voltage.

Figure 2:
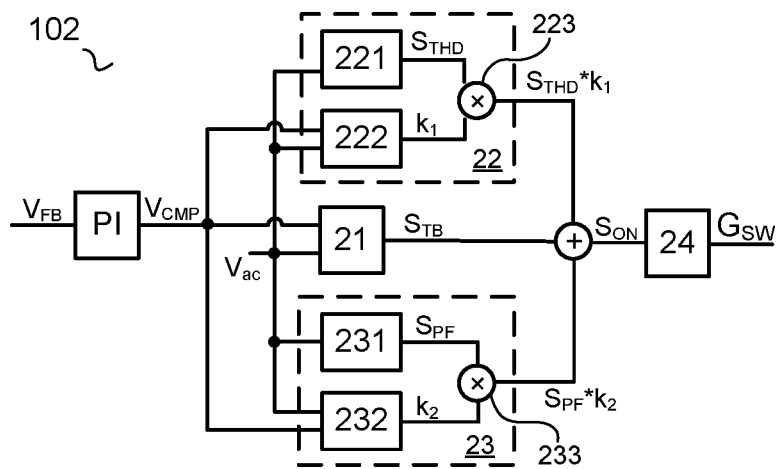
FIG. 2 schematically shows a circuit configuration of the controller 102 in accordance with an embodiment of the present invention.

FIG. 2 schematically shows a circuit configuration of the controller 102 in accordance with an embodiment of the present invention. In the example of FIG. 2, the controller 102 comprises: a proportional integral circuit PI, a basic ON time duration unit 21, a THD compensate circuit 22, a PF compensate circuit 23, and a logical unit 24. The proportional integral circuit PI is configured to generate a proportional integral signal $V_{CMP}$ in response to a feedback voltage $V_{FB}$ indicative of the output voltage $V_O$ and an internal voltage reference. The basic ON time duration unit 21 is configured to generate a basic signal $S_{TB}$ in response to the peak value of the AC input voltage $V_{ac}$ and the proportional integral signal $V_{CMP}$. The THD compensate circuit 22 is configured to obtain the THD compensate signal $S_{THD}$ and the first coefficient $k_1$ in response to the AC input voltage $V_{ac}$ and the proportional integral signal $V_{CMP}$, to generate the product ($S_{THD}*K_1$) of the THD compensate signal $S_{THD}$ and the first coefficient $k_1$. The PF compensate circuit 23 is configured to obtain the PF compensate signal $S_{PF}$ and the second coefficient $k_2$ in response to the AC input voltage $V_{ac}$ and the proportional integral signal $V_{CMP}$, to generate the product ($S_{PF}*K_2$) of the PF compensate signal $S_{PF}$ and the second coefficient $k_2$. The logical unit 24 is configured to generate the control signal $G_{SW}$ in response to the basic signal $S_{TB}$, the product ($S_{THD}*K_1$) of the THD compensate signal $S_{THD}$ and the first coefficient $k_1$, and the product ($S_{PF}*K_2$) of the PF compensate signal $S_{PF}$ and the second coefficient $k_2$, to control the main power switch S1.

In one embodiment of the present invention, the control circuit 102 further comprises a summing circuit, configured to perform an add operation on the basic signal $S_{TB}$, the product ($S_{THD}*K_1$) of the THD compensate signal $S_{THD}$ and the first coefficient $k_1$, and the product ($S_{PF}*K_2$) of the PF compensate signal $S_{PF}$ and the second coefficient $k_2$, to generate the ON time signal $S_{ON}$, which is then delivered to the logical unit 24. Accordingly, the control signal $G_{SW}$ is generated.

In one embodiment of the present invention, an effective time duration (e.g., the time duration of the logical high level) of the basic signal $S_{TB}$ is $T_B$ in one switching cycle. An effective time duration (e.g., the time duration of the logical high level) of the THD compensate signal $S_{THD}$ is $T_{THD}$ in one switching cycle. An effective time duration (e.g., the time duration of the logical high level) of the PF compensate signal $S_{PF}$ is $T_{PF}$ in one switching cycle.

In one embodiment of the present invention, the THD compensate circuit 22 comprises: a THD unit 221, a first coefficient unit 222, and a first multiplication unit 223. The THD unit 221 is configured to generate the THD compensate signal $S_{THD}$ in response to the AC input voltage $V_{ac}$. The effective time duration of the THD compensate signal $S_{THD}$ varies with the instantaneous value of the AC input voltage $V_{ac}$. The first coefficient unit 222 is configured to judge whether the RMS of the AC input voltage $V_{ac}$ is a high voltage or a low voltage, and judge whether the load current is high or low, to generate the first coefficient $k_1$ with a corresponding compensate value. For example, the RMS of the AC input voltage $V_{ac}$ may be compared with the high voltage threshold or the low voltage threshold, to detect the AC input voltage $V_{ac}$ condition; and the proportional integral signal $V_{CMP}$ may be compared with the high current threshold or the low current threshold, to detect the load condition. The first multiplication unit 223 is configured to perform a multiply operation on the THD compensate signal $S_{THD}$ and the first coefficient $k_1$, to generate the product $(S_{THD}*K_1)$ of the THD compensate signal $S_{THD}$ and the first coefficient $k_1$.

In one embodiment of the present invention, the PF compensate circuit 23 comprises: a PF unit 231, a second coefficient unit 232, and a second multiplication unit 233. The PF unit 231 is configured to generate the PF compensate signal $S_{PF}$ in response to the AC input voltage $V_{ac}$. The effective time duration of the PF compensate signal varies with the instantaneous value of the AC input voltage $V_{ac}$. The second coefficient unit 232 is configured to judge whether the RMS of the AC input voltage $V_{ac}$ is a high voltage or a low voltage, and judge whether the load current is high or low, to generate the second coefficient $k_2$ with a corresponding trim value. The second multiplication unit 233 is configured to perform a multiply operation on the PF compensate signal $S_{PF}$ and the second coefficient $k_2$, to generate the product $(S_{PF}*K_2)$ of the PF compensate signal $S_{PF}$ and the second coefficient $k_2$.

Figure 3:
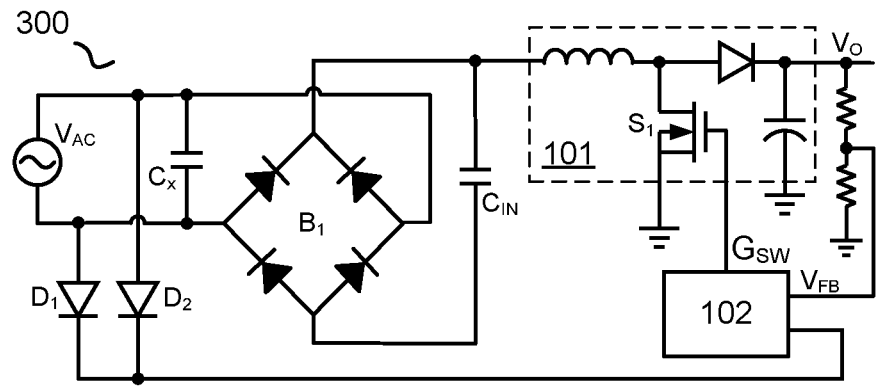
FIG. 3 schematically shows a switching regulator 300 with a circuit configuration of the power stage 101 in accordance with an embodiment of the present invention.

In one embodiment of the present invention, the power stage circuit 101 further comprises a freewheeling power switch (as shown in FIG. 3), configured to free wheel the current when the main power switch is OFF. The logical unit 24 is further configured to receive a zero crossing information of the current flowing through the freewheeling power switch, to control the main power switch.

FIG. 3 schematically shows a switching regulator 300 with a circuit configuration of the power stage 101 in accordance with an embodiment of the present invention. In the example of FIG. 3, the power stage 101 comprises a boost circuit, having an input inductor, the main power switch S1, a freewheeling power switch and an output capacitor. The control circuit 102 is configured to receive the AC input voltage $V_{ac}$ via a first diode $D_1$ and a second diode $D_2$, and is configured to receive the feedback voltage $V_{FB}$ via a resistor divider, to generate the control signal $G_{SW}$, which is used to control the main power switch S1 to have different ON time durations under different AC input voltage conditions and different load currents.

Figure 4:
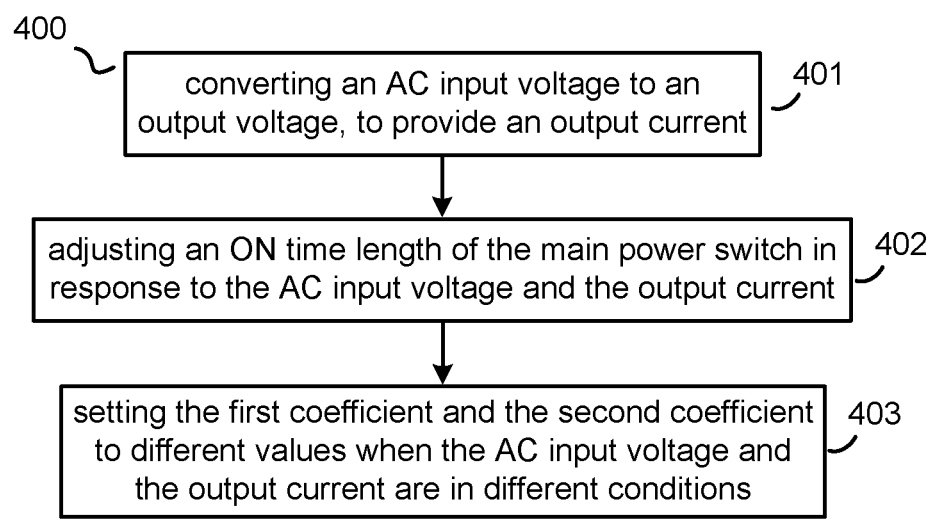
FIG. 4 schematically shows a flowchart 400 of a method used in a switching regulator in accordance with an embodiment of the present invention.

FIG. 4 schematically shows a flowchart 400 of a method used in a switching regulator in accordance with an embodiment of the present invention. The switching regulator includes a power stage having a main power switch. The main power switch is periodically controlled to be turned on and off. The method comprises:

Step 401, converting an AC input voltage to an output voltage, to provide power a load.

Step 402, adjusting an ON time duration of the main power switch in response to the AC input voltage and a load current, the ON time duration of the main power switch consisting of a basic time duration, a product of a THD compensate time duration and a first coefficient, and a product of a PF compensate time duration and a second coefficient. And Step 403: setting the first coefficient and the second coefficient to be different values when the AC input voltage and the load current are in different conditions.

In one embodiment, the first coefficient is set to be a first compensate value and the second coefficient is set to be a first trim value, when a root-mean-square (RMS) value of the AC input voltage is higher than a high voltage threshold and the load current is higher than a high current threshold. The first coefficient is set to be a second compensate value and the second coefficient is set to be a second trim value, when the RMS value of the AC input voltage is higher than the high voltage threshold and the load current is lower than a low current threshold. The first coefficient is set to be a third compensate value and the second coefficient is set to be a third trim value, when the RMS value of the AC input voltage is lower than a low voltage threshold and the load current is higher than the high current threshold. The first coefficient is set to be a fourth compensate value and the second coefficient is set to be a fourth trim value, when the RMS value of the AC input voltage is lower than the low voltage threshold and the load current is lower than the low current threshold.

In one embodiment of the present invention, the basic time duration is determined by the load current and a peak value of the AC input voltage.

In one embodiment of the present invention, the THD compensate time duration and the PF compensate time duration both vary with an instantaneous value of the AC input voltage.

Several embodiments of the foregoing switching regulator set different effective THD compensate time durations and different effective PF compensate time durations, to adjust the ON time duration of the main power switch under different instantaneous values of the AC input voltage and different load currents. Thus, power factor and total harmonic distortion are optimized.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A switching regulator, comprising:
   a power stage, configured to convert an AC input voltage to an output voltage to power a load, the power stage at least having a main power switch; and
   a control circuit, configured to generate a control signal in response to the AC input voltage and the output voltage, to control the ON and OFF of the main power switch, so that the main power switch has different ON time durations under different AC input voltage conditions and different load currents; the ON time duration of the main power switch consisting of a basic time duration, a product of a THD compensate time duration and a first coefficient, and a product of a PF compensate time duration and a second coefficient.

2. The switching regulator of claim 1, wherein:
   when a root-mean-square (RMS) value of the AC input voltage is higher than a high voltage threshold and the load current is higher than a high current threshold, the first coefficient has a first compensate value, and the second coefficient has a first trim value.

3. The switching regulator of claim 1, wherein:
when a root-mean-square (RMS) value of the AC input voltage is higher than a high voltage threshold and the load current is lower than a low current threshold, the first coefficient has a second compensate value, and the second coefficient has a second trim value.

4. The switching regulator of claim 1, wherein:
when a root-mean-square (RMS) value of the AC input voltage is lower than a low voltage threshold and the load current is higher than a high current threshold, the first coefficient has a third compensate value, and the second coefficient has a third trim value.

5. The switching regulator of claim 1, wherein:
when a root-mean-square (RMS) value of the AC input voltage is lower than a low voltage threshold and the load current is lower than a low current threshold, the first coefficient has a fourth compensate value, and the second coefficient has a fourth trim value.

6. The switching regulator of claim 1, wherein:
the basic time duration is determined by the load current and a peak value of the AC input voltage; and
the THD compensate time duration and the PF compensate time duration both vary with an instantaneous value of the AC input voltage.

7. A control circuit used in a switching regulator, the switching regulator including a power stage configured to converting an AC input voltage to an output voltage to power a load, the control circuit comprising:
a proportional integral circuit, configured to generate a proportional integral signal in response to the output voltage and a voltage reference;
a basic ON time duration unit, configured to generate a basic signal in response to a peak value of the AC input voltage and the proportional integral signal;
a THD compensate circuit, configured to generate a THD compensate signal and a first coefficient in response to the AC input voltage and the proportional integral signal, to output a product of the THD compensate signal and the first coefficient;
a PF compensate circuit, configured to generate a PF compensate signal and a second coefficient in response to the AC input voltage and the proportional integral signal, to output a product of the PF compensate signal and the second coefficient; and
a logical unit, configured to generate a control signal in response to the basic signal, the product of the THD compensate signal and the first coefficient, and the product of the PF compensate signal and the second coefficient, to control a main power switch in the power stage.

8. The control circuit of claim 7, wherein the THD compensate circuit comprises:
a THD unit, configured to generate the THD compensate signal in response to the AC input voltage, wherein the THD compensate signal has an effective time duration varying with an instantaneous value of the AC input voltage;
a first coefficient unit, configured to judge whether a root-mean-square (RMS) of the AC input voltage is a high voltage or a low voltage, and judge whether a load current is high or low, to generate the first coefficient with a corresponding compensate value; and
a first multiplication unit, configured to perform a multiply operation on the THD compensate signal and the first coefficient, to output the product of the THD compensate signal and the first coefficient.

9. The control circuit of claim 7, wherein the PF compensate circuit comprises:
a PF unit, configured to generate the PF compensate signal in response to the AC input voltage, wherein the PF compensate signal has an effective time duration of varying with an instantaneous value of the AC input voltage;
a second coefficient unit, configured to judge whether a root-mean-square (RMS) of the AC input voltage is a high voltage or a low voltage, and judge whether a load current is high or low, to generate the second coefficient with a corresponding trim value; and
a second multiplication unit, configured to perform a multiply operation on the PF compensate signal and the second coefficient, to output the product of the PF compensate signal and the second coefficient.

10. The control circuit of claim 7, wherein:
when a root-mean-square (RMS) value of the AC input voltage is higher than a high voltage threshold and a load current is higher than a high current threshold, the first coefficient has a first compensate value, and the second coefficient has a first trim value.

11. The control circuit of claim 7, wherein:
when a root-mean-square (RMS) value of the AC input voltage is higher than a high voltage threshold and a load current is lower than a low current threshold, the first coefficient has a second compensate value, and the second coefficient has a second trim value.

12. The control circuit of claim 7, wherein:
when a root-mean-square (RMS) value of the AC input voltage is lower than a low voltage threshold and a load current is higher than a high current threshold, the first coefficient has a third compensate value, and the second coefficient has a third trim value.

13. The control circuit of claim 7, wherein:
when a root-mean-square (RMS) value of the AC input voltage is lower than a low voltage threshold and a load current is lower than a low current threshold, the first coefficient has a fourth compensate value, and the second coefficient has a fourth trim value.

14. The control circuit of claim 7, wherein:
the basic signal has an effective time duration determined by a load current and a peak value of the AC input voltage; and
the THD compensate signal and the PF compensate signal both have a time duration varying with an instantaneous value of the AC input voltage.

15. A method used in a switching regulator, the switching regulator including a power stage having a main power switch, periodically controlled to be turned on and off, the method comprising:
converting an AC input voltage to an output voltage, to provide power a load;
adjusting an ON time duration of the main power switch in response to the AC input voltage and a load current, the ON time duration of the main power switch consisting of a basic time duration, a product of a THD compensate time duration and a first coefficient, and a product of a PF compensate time duration and a second coefficient; and
setting the first coefficient and the second coefficient to be different values when the AC input voltage and the load current are in different conditions.

16. The method of claim 15, wherein:
the first coefficient is set to be a first compensate value and the second coefficient is set to be a first trim value, when a root-mean-square (RMS) value of the AC input voltage is higher than a high voltage threshold and the load current is higher than a high current threshold.

17. The method of claim 15, wherein:
the first coefficient is set to be a second compensate value and the second coefficient is set to be a second trim value, when a root-mean-square (RMS) value of the AC input voltage is higher than a high voltage threshold and the load current is lower than a low current threshold.

18. The method of claim 15, wherein:
the first coefficient is set to be a third compensate value and the second coefficient is set to be a third trim value, when a root-mean-square (RMS) value of the AC input voltage is lower than a low voltage threshold and the load current is higher than a high current threshold.

19. The method of claim 15, wherein:
the first coefficient is set to be a fourth compensate value and the second coefficient is set to be a fourth trim value, when a root-mean-square (RMS) value of the AC input voltage is lower than a low voltage threshold and the load current is lower than a low current threshold.

20. The method of claim 15, wherein:
the basic time duration is determined by the load current and a peak value of the AC input voltage; and
the THD compensate time duration and the PF compensate time duration both vary with an instantaneous value of the AC input voltage.

* * * * *